Figures 1, 2:
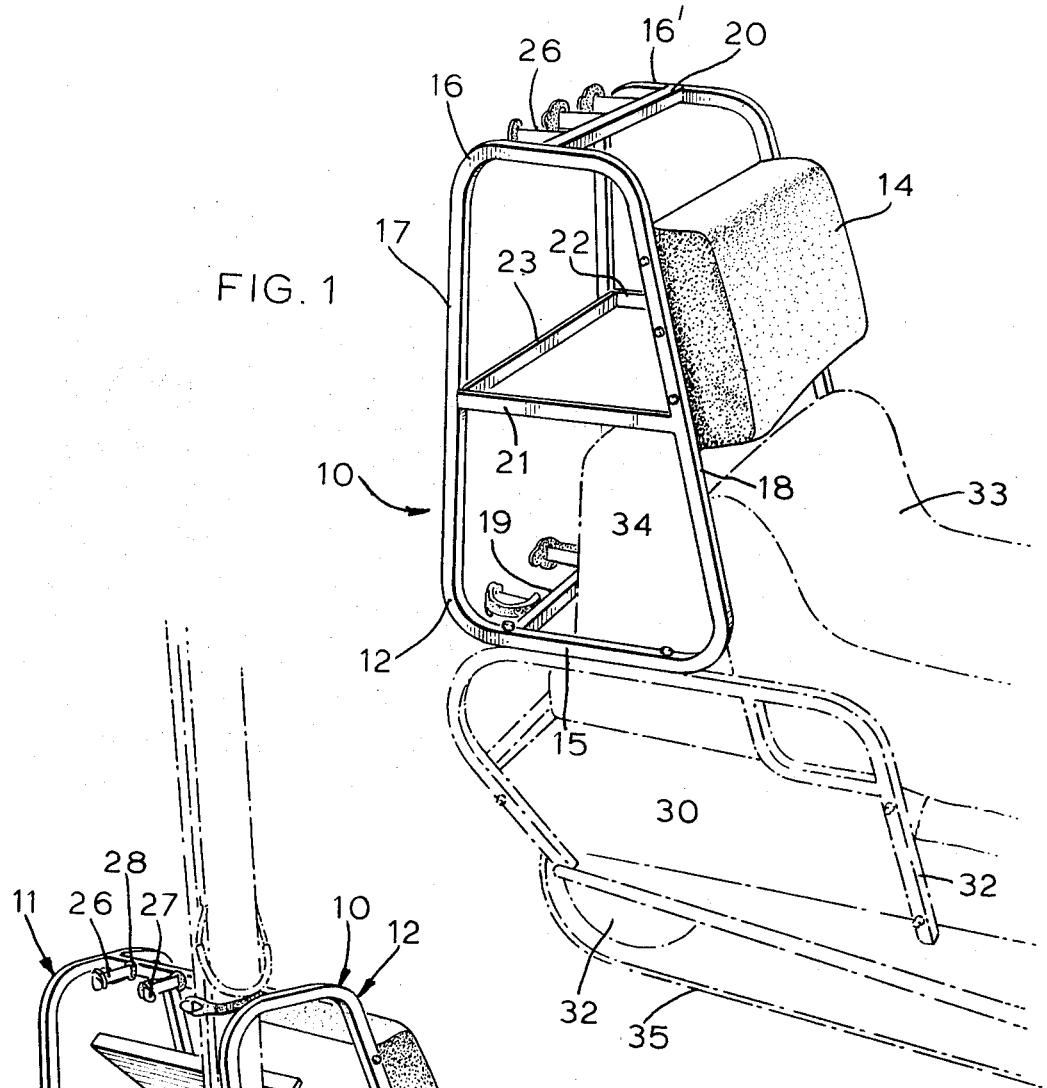

United States Patent
Baker

[15] 3,658,358
[45] Apr. 25, 1972

[54] PROTECTIVE STORAGE STRUCTURE FOR SNOW-MOBILES

[72] Inventor: Frederick A. Baker, Toronto, Ontario, Canada

[73] Assignee: Alltrack Vehicles Limited, Weston, Ontario, Canada

[22] Filed: Apr. 10, 1970

[21] Appl. No.: 27,370

[52] U.S. Cl..................280/150 R, 180/5 R, 224/42.44, 280/150 C, 297/391
[51] Int. Cl...........................................B60r 9/06
[58] Field of Search............180/5 R; 280/150 C, 289, 150 R; D90/1, 8.1, 16; 297/191, 391, 397; 224/42.21, 42.44

[56] References Cited

UNITED STATES PATENTS

| | | |
|---|---|---|
| 3,552,514 | 1/1971 | Alpers..................280/150 C X |
| D216,609 | 2/1970 | Ross..........................D90/16 |
| 3,146,001 | 8/1964 | McFadyen..................280/150 C |
| 1,648,094 | 11/1927 | Williams....................224/42.44 |

OTHER PUBLICATIONS

Bel–Mart Catalog Received Mar. 14, 1968, p. 1, "Sissy Bar" in the middle
Banner Manufacturing Company Catalog sheet received Mar. 14, 1968, "High–Rise" Support Bar No. PSB–5 at left Primary Examiner—Benjamin Hersh
Assistant Examiner—Winston H. Douglas
Attorney—Sim & McBurney

[57] ABSTRACT

A structure for providing protection for snow-mobile riders and storage at the rear end of the vehicle. A rigid frame extends upwards over the rear of the vehicle to prevent the riders from being crushed and upon this frame a rear-seat back rest and a tray may be mounted to provide storage.

4 Claims, 2 Drawing Figures

PATENTED APR 25 1972

3,658,358

INVENTOR.
FREDERICK A. BAKER
BY
N M S Johnston

PROTECTIVE STORAGE STRUCTURE FOR SNOW-MOBILES

This invention relates to snow-mobiles and more particularly to means for providing protection and comfort for the riders and storage.

The use of snow-mobile vehicles both for commerce and pleasure has increased considerably in recent years and with this increase the accident rate frequency has also increased.

As presently constructed most of these vehicles accommodate two riders. The position of the rear rider is precarious. The front rider has the steering mechanism to grip whereas the rear rider is normally provided with a pair of side handles. If the machine accidentally turns over, the rear rider is more prone to injury and head injuries are common.

A second shortcoming of snow-mobiles is the absence of storage or stow space. Normally, if the rider has to carry any equipment, a trailed toboggan has to be employed. No storage space is presently provided on these vehicles for bulky items.

A further shortcoming is the vulnerability of the gasoline tank. In many snowmobiles the tanks are made of plastic or any equivalent material and are mounted at the rear of the vehicle. These tanks are not normally protected from impact and as a consequence in cold weather the tanks become brittle and in collisions the tank frequently catches fire on impact.

It is therefore the main object of the present invention to provide means whereby a storage facility may be provided for snow-mobiles and at the same time a measure of comfort and protection for the riders.

There is accordingly provided, in accordance with the present invention, a rigid frame structure which may be mounted adjacent the rear end of a snow-mobile. A cushioned member may be mounted across this frame to provide a backrest for the rear seat and a hinged or otherwise movable tray may be mounted within the frame above the gasoline tank to permit access to the tank while providing storage. A further feature which may be incorporated is the provision of a rack for holding long objects.

Other features and objects of the present invention will be more apparent from the following description and drawings in which a specific embodiment is illustrated by way of example and in which:

FIG. 1 is a three-quarter perspective view from the front of a protective structure in accordance with the present invention and in which the rear end of a snow-mobile is shown in dotted outline; and FIG. 2 is a three-quarter perspective view from the rear of the structure illustrated in FIG. 1.

Referring now to the drawings, FIGS. 1 and 2 are three-quarter perspective views from the front and rear, respectively, of a preferred embodiment of the present invention mounted upon a snow-mobile vehicle, the rear end of which is shown in dotted outline.

Those parts of the rear end of the vehicle which are shown comprise a frame 30 below which the track and rear drive wheel 35 and 32, respectively, are visible. Mounted on frame 30, there is a hand rail 32 and the seat of the vehicle is indicated at 33. Immediately rearward of the seat upon the frame 30 there is a gas tank 34.

As illustrated the preferred embodiment comprises a framelike structure 10 shown in solid outline with side members 11 and 12 so disposed or spaced apart that they will sit upon and be secured to the hand rails 32. Side members 11 and 12 are preferably tubular in form being bent to any desirable configuration such as that shown to provide a bottom rail 15, a top rail 16, a substantially vertical rear rail 17 and an upwardly and a rearwardly sloping front rail 18. Between the two side members 11 and 12 a cushioned member 14 is secured to extend between the two corresponding front rails 18. The structure of the cushion comprises a substantially rigid rear plate, which is not visible, secured by means of screws to the corresponding side rails and to this plate there is attached a cushioning material such as foam or its equivalent and a suitable leather or plastic cover. The bottom rails 15 are each secured to their corresponding hand rail 32 again by means of screws or welding and adjacent the rear end, near the junction of rear rail 17, and the bottom rail 15, a transverse rail or rod extends. A corresponding rail or rod 20 may also be secured between the upper rails 16 in the manner shown.

Intermediate the height of the side members 11 and 12 two laterally extending rails 21 and 22 are mounted. These rails are substantially L-shaped and provide a flange upon which a tray 23 may be mounted. Tray 23 has an upwardly extending rim 24 along its rearmost edge which engages with the adjacent inner surface of the rear rails 17. Tray 23 may also be hinged at its forward end so that it will move in the manner shown in FIG. 2 or it may simply be seated in position being held in that position by its relationship between the adjacent side rails and rear rails and the weight of any load which may be deposited thereupon.

It is to be noted that the disposition of the lateral rails 21 and 22 and the tray 23 is immediately above the gas tank 34. The hingeing or movable characteristic of the tray 23 permits the driver to have access to the gas tank while at the same time providing a facility for storing any articles which may wish to be stored upon the tray.

From the rear surfaces of rails 19 and 20 a series of rearwardly extending projections such as 26 are provided. Each of these projections has a terminal hook 27 and an elastic band 28. These hooks and bands serve to support any long objects such as the skis, 29, shown in dotted outline.

It is to be noted that the rear surface of the rear rail 17 extend to a point adjacent the rear end of the vehicle and rearward of the gas tank 24. This feature together with the transversely extending bar 19 and the tray 23 provide a means for minimizing any impact from the rear of the vehicle. The provision of the cushion on the forward rails 18 also provides a measure of support for the rear seat rider. The entire structure will also provide a measure of protection to the rear seat rider in the event that the machine topples in that it will act as a rollbar serving to prevent the riders from being crushed.

From the foregoing description it will be seen that the structure which has been described in the above description simultaneously provides a measure of protection for the rider and the gasoline tank from rearward impact and will assist in spacing the machine away from the riders in the event that it is toppled. It also provides a certain amount of storage space.

The structure has been described with reference to a frame. It will of course be obvious that other enclosed structures may be provided and other modifications made without departing from the scope of the invention as defined in the appended claims.

What I claim as my invention is:

1. A protective structure for snow-mobile vehicle riders comprising:
   a rigid frame including a pair of side members adapted to be mounted and secured to a snow-mobile on opposed sides adjacent the rear end thereof, said members extending upwardly for a predetermined distance;
   a forwardly facing cushioned member connected to said side members adjacent the forward ends thereof to provide passenger back rest;
   at least one rigid transversely extending member secured to said side members in a spaced apart relationship adjacent the rear end of said vehicle,
   a pair of lateral members each providing a lateral inwardly extending flange,
   and a movable shelf dimensioned to be seated upon the said flanges.

2. A protective structure as claimed in claim 1, in which the shelf is hinged at its forward edge to said rigid frame.

3. A protective structure as claimed in claim 1 including a pair of rigid transversely extending members, one of said members being secured to said side members adjacent the rear bottom end thereof, the other of said members being secured to said side members adjacent the top thereof.

4. A protective structure as claimed in claim 3 wherein said first and second mentioned transverse rigid members each have at least one projection thereof extending in parallel and an elastic member removably secured thereto.

* * * * *